(12) United States Patent
Ciechomski et al.

(10) Patent No.: US 8,023,792 B2
(45) Date of Patent: Sep. 20, 2011

(54) SYSTEM FOR THE DISTRIBUTION OF OPTICAL FIBERS

(75) Inventors: Tomasz Ciechomski, Lowicz (PL); Michal Wojda, Lodz (PL); Ian Cowser, Cypress Point (GB)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 12/566,191

(22) Filed: Sep. 24, 2009

(65) Prior Publication Data

US 2010/0080524 A1 Apr. 1, 2010

(30) Foreign Application Priority Data

Sep. 30, 2008 (EP) ..................................... 08017162

(51) Int. Cl.
*G02B 6/00* (2006.01)

(52) U.S. Cl. ........................................ 385/135; 385/134

(58) Field of Classification Search ........................ None
See application file for complete search history.

(56) References Cited

U.S. PATENT DOCUMENTS

| | | | | |
|---|---|---|---|---|
| 5,778,132 A | * | 7/1998 | Csipkes et al. | 385/135 |
| 6,311,007 B1 | * | 10/2001 | Daoud | 385/135 |
| 6,741,784 B1 | * | 5/2004 | Guan | 385/135 |
| 2005/0259928 A1 | | 11/2005 | Elkins, II et al. | 385/100 |
| 2005/0276562 A1 | * | 12/2005 | Battey et al. | 385/135 |
| 2008/0145008 A1 | | 6/2008 | Lewallen et al. | 385/100 |
| 2009/0097813 A1 | * | 4/2009 | Hill | 385/135 |

FOREIGN PATENT DOCUMENTS

| | | |
|---|---|---|
| EP | 1944635 | 7/2008 |
| JP | 2001-116968 | 4/2001 |
| WO | WO97/25642 | 7/1997 |

* cited by examiner

*Primary Examiner* — Tina Wong
(74) *Attorney, Agent, or Firm* — John H. Vynalek

(57) ABSTRACT

A system for the distribution of optical fibers is disclosed. The system has a first furcation area, which is associated with a first fiber optic cable, to tap off a subset of the optical fibers of the first fiber optic cable in the form of a tether cable. The first fiber optic cable may be a riser cable. The tether cable is supplied to a spool device to store any excess length of the tether cable while complying with the minimum permissible bending radius of the optical fibers. The system has a second furcation area, which is associated with the spool device, to separate the optical fibers of the tether cable. The separated optical fibers of the tether cable can each be supplied to an individual splice storage device in which, in each case, one spliced joint can be placed between a separated optical fiber of the tether cable and an optical fiber of a second fiber optic cable, which may be a drop cable.

11 Claims, 3 Drawing Sheets

SYSTEM FOR THE DISTRIBUTION OF OPTICAL FIBERS

CROSS-REFERENCE TO RELATED APPLICATIONS

This application claims benefit under 35 U.S.C. §119 of European Patent Application No. 08 017 162.2 filed Sep. 30, 2008, which is incorporated herein by reference in its entirety.

BACKGROUND

1. Field of the Disclosure

The technology of the disclosure relates to a system for the distribution of optical fibers, specifically optical fibers furcated from a first fiber optic cable, in particular a riser cable, to second fiber optic cables, in particular to drop cables.

2. Technical Background

Particularly in the case of so-called FTTH (fiber to the home) applications, it is necessary to furcate the optical fiber of a first fiber optic cable which has a plurality of optical fibers to connect to a plurality of drop cables, which each have a single optical fiber. Systems such as these must have a simple design and must be scalable as required in order, depending on the requirement, to increase the number of the second fiber optic cables, in particular the drop cables, whose optical fibers are intended to be connected to the optical fibers in the first fiber optic cable, in particular the riser cable. Until now, no systems which meet these requirements have been known for distribution of optical fibers.

SUMMARY

In one aspect, there is provided a system for distributing optical fibers from a first fiber optic cable. The system comprises a spool device for storing excess length of a tether cable comprising optical fibers tapped off from the first fiber optic cable. A furcation area is associated with the spool device for separating the optical fibers of the tether cable. The system also comprises a splice storage device for placing a splice joint between an optical fiber separated from the tether cable at the furcation area of the spool device and an optical fiber of a second fiber optic cable.

In another aspect, there is provided an assembly for distributing optical fibers from a first fiber optic cable. The assembly comprises a wall box having a first furcation adapter at which one or more optical fibers of a riser cable are tapped off in a tether cable. A spool device is positioned in the wall box. The spool device is for storing excess length of a tether cable. The spool device has a cylindrical housing comprising a housing upper part and a housing lower part. A cylindrical wall of the housing upper part and/or the housing lower part has an insertion area for the tether cable. The spool device has a second furcation adapter for separating the optical fibers of the tether cable.

A splice storage device is also positioned in the wall box. The splice storage device is for placing a splice joint between an optical fiber separated from the tether cable and an optical fiber of a drop cable. The splice storage device has housing comprising a housing upper part and a housing lower part. The housing upper part and/or the housing lower part has a first insertion area for the tether cable and a second insertion area for the drop cable.

In another aspect, there is provided a method for distributing optical fibers from a first fiber optic cable. The method comprising providing a wall box having a first furcation adapter at which one or more optical fibers of a riser cable introduced into the wall box are tapped off in a tether cable. The method also comprises positioning a spool device and a splice storage device in the wall box. The spool device is for storing excess length of a tether cable and has a second furcation adapter for separating the optical fibers of the tether cable. A splice joint between an optical fiber separated from the tether cable and an optical fiber of a drop cable is placed in the splice storage device.

DETAILED DESCRIPTION

Reference will now be made in detail to the preferred embodiments, examples of which are illustrated in the accompanying drawings, in which some, but not all embodiments are shown. Indeed, the disclosure should not be construed as limited to the embodiments set forth herein; rather, these embodiments are provided so that this disclosure will satisfy applicable legal requirements. Whenever possible, like reference numbers will be used to refer to like components or parts.

A system for the distribution of optical fibers has a first furcation area, which is associated with the first fiber optic cable, in order to tap off a subset of the optical fibers of the first fiber optic cable in the form of a tether cable. The tether cable is supplied to a spool device in order to store any excess length of the tether cable while complying with the minimum permissible bending radius of the optical fibers. The system has a second furcation area, which is associated with the spool device, in order to separate the optical fibers of the tether cable. The separated optical fibers of the tether cable can each be supplied to an individual splice storage device in which, in each case, one spliced joint can be placed between a separated optical fiber of the tether cable and an optical fiber of a second fiber optic cable.

The tether cable tapped off from the first fiber optic cable can be wound up on the spool device. The tether cable may be, in particular, from the riser cable. In addition to the spool device, the system has a plurality of splice storage devices, in which case a spliced joint between a separated optical fiber in the tether cable and the optical fiber in a second fiber optic cable, in particular a drop cable, can in each case be placed in each splice storage device. A separate splice storage device is provided for every second fiber optic cable, in order to connect the optical fiber of the respective second fiber optic cable to an optical fiber of the tether cable, with the optical fibers of the tether cable being separated in the second furcation area. The system is distinguished by a simple design and, furthermore, can be scaled as required.

Figure 1:
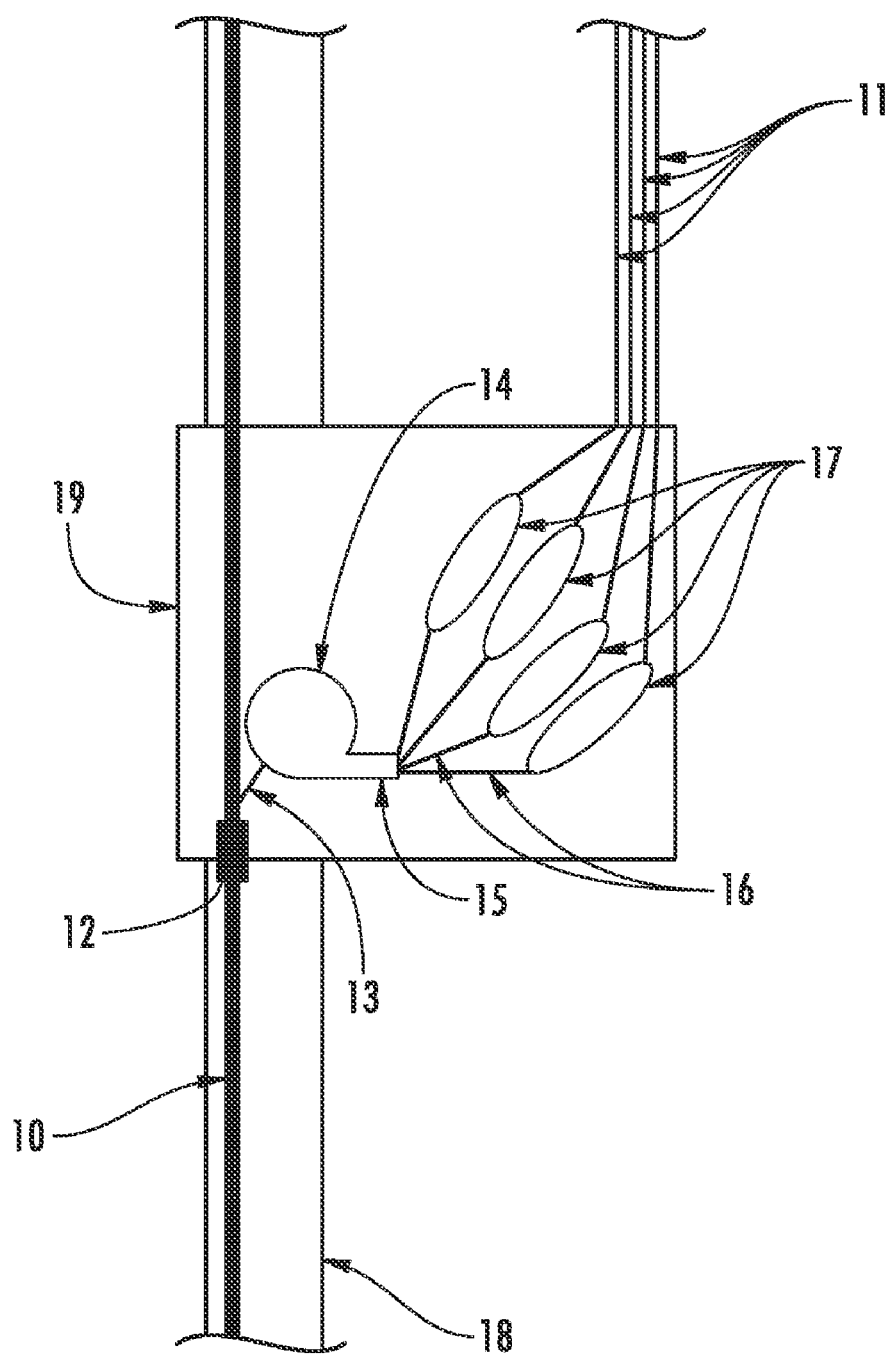
FIG. 1 is a schematic view illustrating a system according to an embodiment.

FIG. 1 shows a schematic illustration of a system for distribution of optical fibers, specifically for furcation of optical fibers of a first fiber optic cable, which comprises a plurality of optical fibers, to a plurality of second fiber optic cables, which each comprise a single optical fiber. The first fiber optic cable, which comprises the plurality of optical fibers, is referred to in the following text as a riser cable 10. The second fiber optic cables, which each comprise a single optical fiber, are referred to in the following text as drop cables 11.

In the system, as illustrated in FIG. 1, for distribution of optical fibers, the riser cable 10 has an associated first furcation area in the form of a first furcation adapter 12, in which case a plurality of optical fibers of the riser cable 10 can be tapped off from the riser cable 10 in the form of a tether cable 13, with the aid of the first furcation adapter 12. Like the riser cable 10, the tether cable 13 has a multiplicity of optical fibers, with the tether cable 13 comprising a subset of the optical fibers in the riser cable 10.

Any type of furcation adapter 12 can be used to tap off a plurality of optical fibers of the riser cable 10 in order to provide the tether cable 13.

The tether cable 13 can be supplied to a spool device 14, in which case any excess length of the tether cable 13 is stored in the spool device 14, while complying with the minimum permissible bending radius of the optical fibers in the tether cable 13. The spool device 14 is associated with a second furcation area in the form of a second furcation adapter 15, in order to separate the optical fibers in the tether cable 13.

Any type of furcation adapter 15 can be used to separate the optical fibers in the tether cable 13.

As can be seen from FIG. 1, individual optical fibers 16 of the tether cable 13, which are preferably surrounded by small tubes, are passed out of the spool device 14, starting from the second furcation adapter 15, and are passed to splice storage devices 17, in which case a single spliced joint between a single optical fiber 16 in the tether cable 13 and the optical fiber in a drop cable 11 can be placed in each splice storage device 17.

The system for distribution of optical fibers accordingly has a single spool device 14 and a plurality of splice storage devices 17 for each tether cable 13 which is tapped off from the riser cable 10, with the number of splice storage devices 17 corresponding to the number of drop cables 11 whose optical fibers have to be connected to the optical fibers 16 in the tether cable 13.

In the exemplary embodiment shown in FIG. 1, the riser cable 10 runs in a cable duct 18, with the spool device 14 and the splice storage devices 17 being positioned in a wall box 19 which is adjacent to the cable duct 18. The riser cable 10 is introduced into the wall box 19, and passed out of it, via the cable duct 18. The drop cables 11 are inserted directly into the wall box 19.

Figure 2:
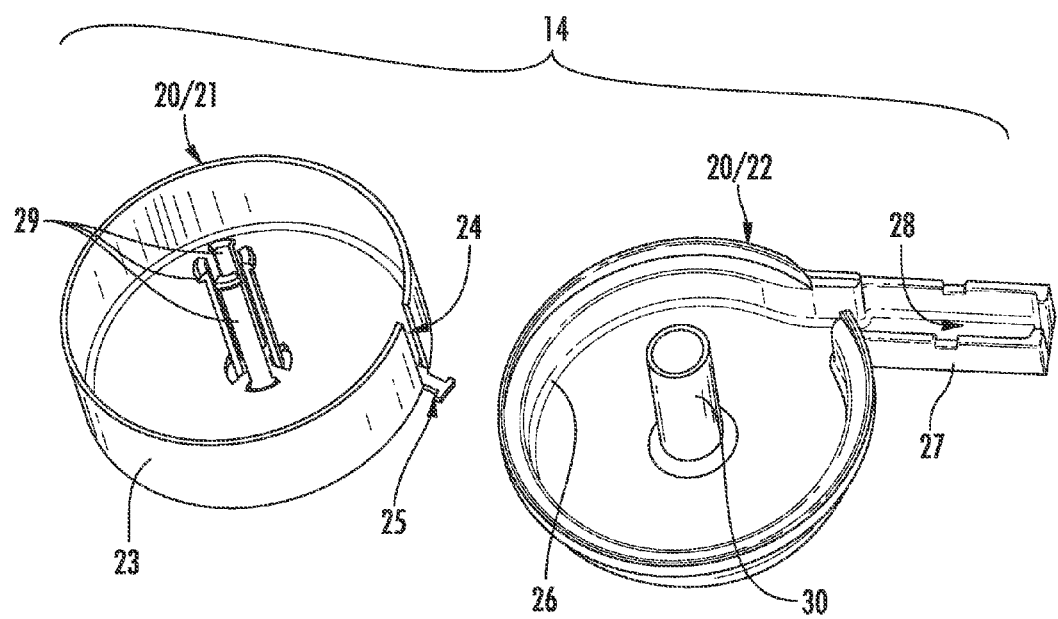
FIG. 2 is a perspective view of an opened spool device in the system shown in FIG. 1.

FIG. 2 shows the spool device 14 in detail in the unfolded state, with the spool device 14 having a cylindrical housing 20 comprising a housing upper part 21 and a housing lower part 22.

The housing upper part 21 has a cylindrical wall 23, with an insertion opening and an insertion area 24 for the tether cable 13 being formed in the cylindrical wall 23 of the housing upper part 21. The insertion area 24 is in the form of a slotted recess, which has an associated strain relief device 25 for the tether cable 13.

The housing lower part 22 likewise has a cylindrical wall 26 and a preferably tangential extension 27 of the cylindrical wall 26, with this tangential extension 27 forming a storage area 28 for the second furcation adapter 15, which is not illustrated in FIG. 2.

The housing upper part 21 and the housing lower part 22 of the housing 20 of the spool device 14 can be connected to one another by inserting anchoring elements 29 of the housing upper part 21 into a tubular connecting section 30 on the housing lower part 22, and by latching them therein. It should be noted that the extension 27 forming the storage area 28 does not need to be tangential. The extension 27 can be done at any other angle from tangential up to the line with the axis of the section 30.

Figure 3:
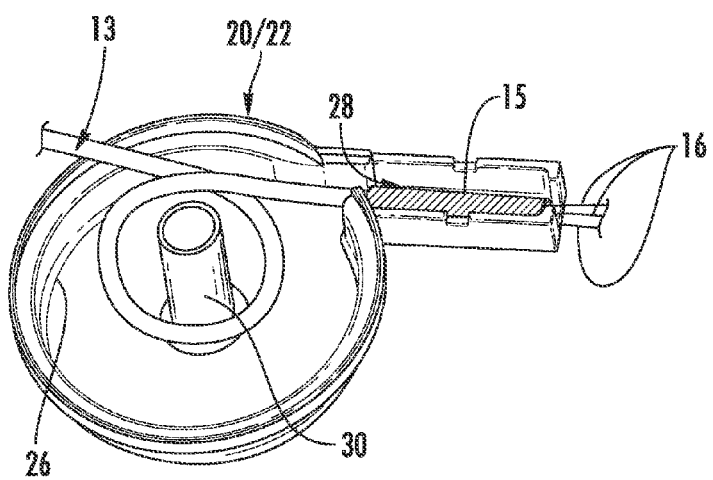
FIG. 3 is a perspective view of a housing lower part of the spool device shown in FIG. 2 together with a tether cable, a second furcation adapter and optical fibers.

FIG. 3 shows the housing lower part 22 of the spool device 14 together with a tether cable 13, the second furcation adapter 15 and individual optical fibers 16 of tether cable 13 separated by said second furcation adapter 15. Any excess lengths of the tether cable 13 can be wound up in the spool device 14.

Winding and unwinding of the tether cable 13 inside spool device 14 can be done by disconnecting housing upper part 21 and housing lower part 22 and by winding or unwinding the desired length of tether cable 13. Winding and unwinding of the tether cable 13 can be done by keeping housing upper part 21 and housing lower part 22 connected and by holding one part 21 or 22 of spool device 14 steady in hand and by rotating the other part 22 or 21 to wind or unwind tether cable 13.

Figure 4:
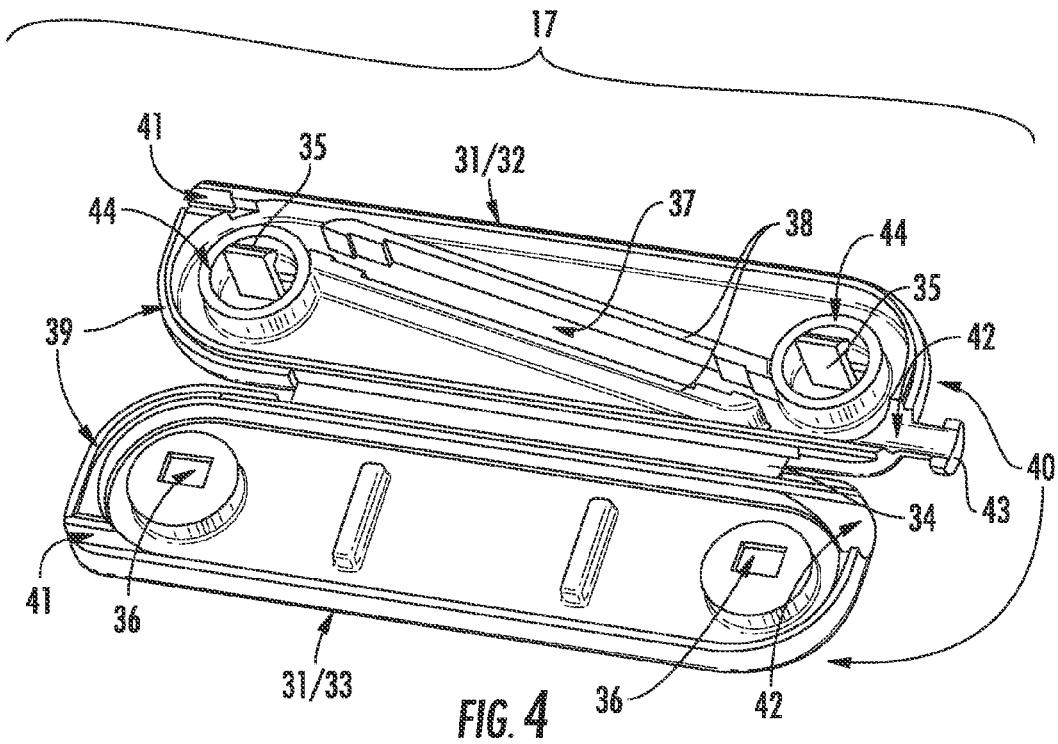
FIG. 4 is a perspective view of an opened splice storage device in the system as shown in FIG. 1.

FIG. 4 shows a perspective view of a splice storage device 17 in the opened state, with the splice storage device 17 having a housing 31 comprising a housing upper part 32 and a housing lower part 33, which are connected to one another, such that they can pivot, via a film hinge 34. In order to close the splice storage device 17, anchoring elements 35 on the housing upper part 32 are inserted into connecting sections 36 in the housing lower part 33, and are latched therein.

The splice storage device 17 has a storage section 37 for a splice protection device 45 (see FIG. 5), in which a spliced joint between an optical fiber 46 in the tether cable 13 and an optical fiber 47 in a drop cable 11 is placed, in which case a splice protection device 45 such as this may, for example, be a crimp splice protection device or a splice protection device which can be shrunk by heat.

Figure 5:
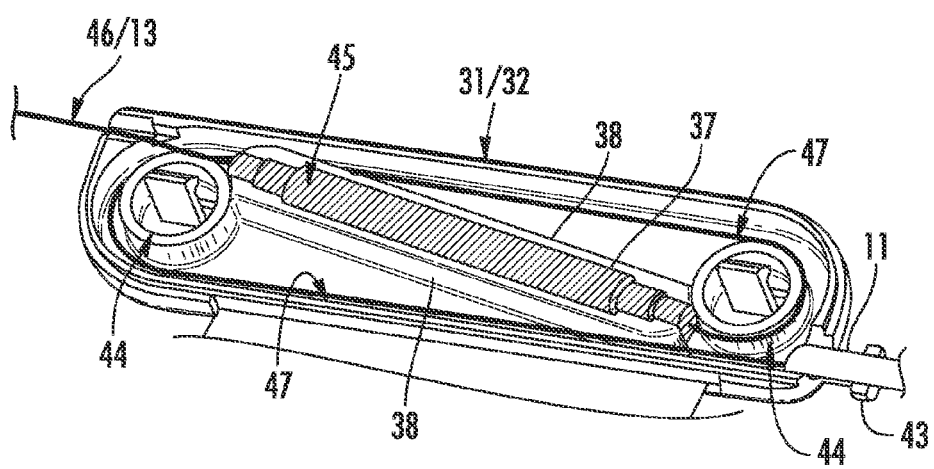
FIG. 5 is a perspective view of an housing upper part of the splice storage device shown in FIG. 4 together with a splice protection device and optical fibers.

The storage area 37 for the splice protection device 45 is in this case formed, as shown in FIGS. 4 and 5, by two webs 38 which, in the illustrated exemplary embodiment, are formed on the housing upper part 32 and extend in a diagonal direction between two opposite ends 39, 40 of the housing 31 of the splice storage device 17.

An insertion area 41 for a separated optical fiber 46 of the tether cable 13, which is surrounded by a small tube (not shown), is formed in the area of the end 39 of the housing 31, in which case, as shown in FIG. 4, the insertion area 41 is formed both in the housing upper part 32 and in the housing lower part 33.

An insertion area 42 for a drop cable 11 is formed at the opposite end 40 of the housing 31 of the splice storage device 17, in order to insert the same into the splice storage device 17, in which case, as shown in FIG. 4, the insertion area 42 for the drop cable 11 is formed, in the same way as the insertion area 41 for a separated optical fiber in the tether cable 13, both in the housing upper part 32 and in the housing lower part 33.

In this case, as shown in FIG. 4, the insertion area 42 for a drop cable 11 has an associated strain relief device 43 for the drop cable 11, with the splice protection device 43 being a component of the housing upper part 32 of the housing 31 of the splice storage device 17.

Cylindrical guide elements 44 are adjacent to both sides of the storage area 37, which is defined by the webs 38, for a splice protection device 45 and form an excess-length store for excess lengths of optical fibers 46, 47 to be spliced to one another, specifically on the one hand an excess-length store for an optical fiber 46 in the tether cable 13, and an excess-length store for an optical fiber 47 in a drop cable 11. These optical fibers 46, 47 can be passed to the guide elements 44 while complying with the minimum permissible bending radii.

Regarding the optical fibers 46 and 47, some embodiments include a tether cable 13 and a drop cable 11 that may have various types of optical fibers which include, but are not limited to, low bend sensitivity optical fibers, bend optimized optical fibers, and bend insensitive optical fibers, all of which are referred to generically herein as "bend performance optical fiber." Use of such bend performance optical fiber enables the optical fibers to undergo a minimum bend radius while providing desired optical performance. Accordingly, some embodiments comprise a spool device 14 and a splice storage device 17 that allow an optical fiber bend radius of between about 0.0254 cm (0.01 inch) to about 2.54 cm (1.0 inch), more preferably between about 0.254 cm (0.1 inch) and 1.27 cm (0.5 inch), and still more preferably of about 0.508 cm (0.2 inch).

It should be noted that it is also possible that the insertion area 41 for a separated optical fiber in the tether cable and the insertion area 42 for a drop cable may be both formed at the same end of the housing upper part 32 and/or of the housing lower part 33 of the housing 31 of the splice storage device 17.

Many modifications and other embodiments will come to mind to one skilled in the art having the benefit of the teachings presented in the foregoing descriptions and the associated drawings.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A system for distributing optical fibers from a first fiber optic cable, the system comprising:
   a spool device for storing excess length of a tether cable comprising optical fibers tapped off from the first fiber optic cable;
   a furcation area associated with the spool device for separating the optical fibers of the tether cable;
   a splice storage device for placing a splice joint between an optical fiber separated from the tether cable at the furcation area of the spool device and an optical fiber of a second fiber optic cable, wherein the spool device has a cylindrical housing comprising a housing upper part and a housing lower part, wherein a cylindrical wall of the housing upper part and/or the housing lower part has a first insertion area for the tether cable, and
   an extension of the housing upper part and/or the housing lower part, wherein the extension forms a storage area for a furcation adapter which provides the furcation area.

2. An assembly for distributing optical fibers from a first fiber optic cable, the system comprising:
   a wall box having a first furcation adapter at which one or more optical fibers of a riser cable are tapped off in a tether cable;
   a spool device positioned in the wall box for storing excess length of a tether cable, wherein the spool device has a cylindrical housing comprising a housing upper part and a housing lower part, and wherein a cylindrical wall of the housing upper part and/or the housing lower part has an insertion area for the tether cable, and wherein the spool device has a second furcation adapter for separating the optical fibers of the tether cable;
   a splice storage device positioned in the wall box for placing a splice joint between an optical fiber separated from the tether cable and an optical fiber of a drop cable, wherein the splice storage device has housing comprising a housing upper part and a housing lower part, wherein the housing upper part and/or the housing lower part has a first insertion area for the tether cable and a second insertion area for the drop cable.

3. The assembly of claim 2, wherein the cylindrical wall of the spool device has an extension forming a storage area for the second furcation adapter.

4. The assembly of claim 3, wherein the extension is tangential to the cylindrical wall.

5. The assembly of claim 2, wherein the first insertion area and the second insertion area are formed at opposite ends of the splice storage device.

6. The assembly of claim 2, wherein the first insertion area and the second insertion area are formed at a same end of the splice storage device.

7. The assembly of claim 2, wherein the splice storage device has a splice storage area for a splice protection device for the splice joint.

8. The assembly of claim 7, wherein the splice storage area is formed by two webs extending diagonally between two opposite ends of the upper housing part.

9. A method for distributing optical fibers from a first fiber optic cable, the method comprising the steps of:
   providing a wall box having a first furcation adapter at which one or more optical fibers of a riser cable introduced into the wall box are tapped off in a tether cable;
   positioning a spool device in the wall box for storing excess length of a tether cable, wherein the spool device has a second furcation adapter for separating the optical fibers of the tether cable; and
   positioning a splice storage device in the wall box for placing a splice joint between an optical fiber separated from the tether cable and an optical fiber of a drop cable.

10. The method of claim 9, wherein the spool device has a cylindrical housing comprising a housing upper part and a housing lower part, and wherein a cylindrical wall of the housing upper part and/or the housing lower part has an insertion area for the tether cable and an extension from the cylindrical wall forming a storage area for the second furcation adapter.

11. The method of claim 9, wherein the splice storage device has housing comprising a housing upper part and a housing lower part, wherein the housing upper part and/or the housing lower part has a first insertion area for the tether cable and a second insertion area for the drop cable, and wherein the housing has a splice storage area for a splice protection device for the splice joint.

* * * * *